United States Patent Office 3,562,215
Patented Feb. 9, 1971

3,562,215
LOW TEMPERATURE, LATENT EPOXY RESIN CURING SYSTEM
Neal E. Moore, St. Paul, Minn., assignor to Minnesota Mining and Manufacturing Company, St. Paul, Minn., a corporation of Delaware
No Drawing. Filed June 9, 1967, Ser. No. 644,797
Int. Cl. C08g 30/14
U.S. Cl. 260—47                               6 Claims

ABSTRACT OF THE DISCLOSURE

A multicomponent curing system stable in the presence of epoxy resin under normal shelf conditions and capable of curing the resin at acceptable rates by in situ generation of curing agents below about 200° F. including a room temperature stable compound decomposable to form an amine having at least one active hydrogen atom, such as 3-phenyl-1,1-dimethyl urea, an OH containing organic compound, such as ethylene glycol, and an organo lead or organo mercury compound, such as lead octoate or phenyl mercuric hydroxide.

BACKGROUND OF THE INVENTION

Field of the invention

This invention relates in one aspect to an improved curing system for epoxy resins and in another to a heat curable bonding composition of an epoxy resin having said improved curing system incorporated therein.

Description of the prior art

One part structural adhesives incorporating both the base material and a curing agent have recognized advantages over their two-part counterparts. With the latter, on site mixing of base and curing agent by workers generally unfamiliar with adhesives often causes errors which premixing by the supplier can eliminate. The user also avoids the need for expensive mixing equipment. Processing of two-part adhesives in film form is particularly subject to errors which are eliminated by one-part adhesive films. One-part adhesives have their disadvantages, however, due in large part to the fact that the curing agents which must be latent at temperatures normally encountered in storage require temperatures of at least 225° F. to 250° F. to initiate curing at an acceptable rate, e.g. 2–5 hours. One disadvantage to the use of cure systems requiring greater than 225° F. is the likelihood of causing intergranular corrosion of aluminum substrates and reduction in fatigue resistance of the bonded materials. Obviously, this would be particularly undesirable in structures employed in aircraft.

It is therefore the primary object of this invention to provide a room temperature latent curing system for an epoxy resin which is activatable at temperatures below those presently required to provide an acceptable cure rate for epoxy adhesives.

SUMMARY OF THE INVENTION

This and other objects which will become apparent hereinafter are provided by an epoxy resin curing system which comprises:

(1) a room temperatures stable, nitrogen containing chemical compound decomposable at elevated temperatures to form an amine having at least one active hydrogen;
(2) an OH containing organic compound, and
(3) an organo-metallic compound wherein the metal is from the class consisting of lead and mercury.

Compositions embodied by the foregoing definition have acceptable shelf life and yet are activatable below 200° F. and generally below 190° F. to provide high performance cured epoxy resin adhesives.

Further, said objects are provided by the above curing system incorporated in a heat-curable epoxy resin, the epoxy resin having at least one 1,2-epoxy group per molecule.

DESCRIPTION OF THE PREFERRED EMBODIMENTS

The epoxy resins suitable in the practice of this invention are typically products from the reaction of an epihalohydrin such as epichlorohydrin and a phenol having at least two phenolic hydroxy groups such as bis-(4-hydroxyphenol)-2,2-propane. Resins of this type are disclosed in U.S. Pats. 2,324,483, 2,444,333, and 3,249,587 and British Pats. 518,087, and 579,698, which patents, as well as other patents and publications cited herein, are incorporated by reference. Suitable epoxy resins are also disclosed in U.S. Pats. 2,494,295, 2,500,600, and 2,511,-913.

Many epoxy resins encompassed by the foregoing description are known in the art, exemplary of which are those sold under the name Epon by Shell Chemical Corp. such as Epon 828, 834, 1001, 1004, 1007, 1009, 1062, and 1064; Araldite by the Ciba Co. such as Araldite 6010 and 6020; Epi-Rez by Devol-Reynolds Co. such as Epi-Rez 510, and ERL resins by Bakelite Co. such as ERL 2774.

The nitrogen containing compound employed in the composition of this invention must be decomposable in the adhesive system at temperatures above about 90° F., and below about 200° F., preferably between about 140° F. and 190° F., to form an amine having an active hydrogen as determined by the Zerewitinoff test described in J. Am. Chem. Soc., 49, 3181 (1927). Included within the term "amine" is ammonia as well as primary and secondary amines. Many such compounds are known, including those represented by the structural formula:

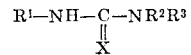

wherein $R^1$, $R^2$, and $R^3$ are monovalent radicals, particularly hydrogen and moieties consisting of nitrogen, carbon, and hydrogen atoms, and X is O, S, or NH. Illustrative of suitable nitrogen containing compounds represented by the above formula are:

3-phenyl-1,1-dimethyl urea;
3-p-chlorophenyl-1,1-dimethyl urea;
3-p-anisyl-1,1-dimethyl urea;
3-p-nitrophenyl-1,1-dimethyl urea;
3-phenyl-1,1-cyclopentamethylene urea;
3-phenyl-1,1-cyclohexamethylene urea;
N-(3,4-dichlorophenyl)-N',N'-dimethyl urea;
3-phenyl-1,1-dibutyl urea;
3-phenyl-1-benzyl-1-methyl urea;
trimethylurea;
3-phenyl-1,1-dimethylene urea;
3-cyclohexyl-1,1-dimethyl urea;
2,4-bis (N,N-dimethyl carbamide) toluene;
N',N'-dimethyl-1,3-propane diamine dicarboxanilide;
1,3-dicyclohexyl urea;
1,3-dimethylol urea;
1,3-diethyl thiourea;
thiourea;
urea;
3-phenyl-1,1-dimethyl thiourea;
semicarbazide;
thiosemicarbazide;
4-phenyl-1,1-dimethyl semicarbazide;
4-phenyl-1,1-dimethyl thiosemicarbazide; and
1-cyanoguanidine;
1,3-diphenyl guanidine.

Preferable among those listed are 3-phenyl-1,1-dimethyl urea, 3-p-anisyl-1,1-dimethyl urea, and 3-p-nitrophenyl-1,1-dimethyl urea.

The decomposition of compounds having the general formula $$R^1-NH-\underset{\underset{X}{\|}}{C}-NR^2R^3$$

results in the formation of an amine and an isocyanate, thiosocyanate, or imine, viz, $R^1-N=C=X$ and $HNR^2R^3$. Thus, employing 3-phenyl-1,1-dimethyl urea as the nitrogen containing compound, the products formed on thermal decomposition are dimethylamine and phenylisocyanate.

The OH containing compound included in the curing system of this invention may be an aliphatic, alicyclic, or aromatic alcohol, carboxylic acid, hydroxy acid, or mixture thereof. Such compound may contain one or a plurality of hydroxy or carboxyl groups. Aliphatic polyhydroxy compounds are preferred, especially ethylene glycol and glycerol. Representative OH containing compounds suitable in the practice of this invention are the following: ethylene glycol, glycerol, triethylene glycol, bisphenol A, methanol, n-butanol, phenol, o-cresol, m-cresol, p-cresol, resorcinol, o-bromophenol, n-hexanol, trichloracetic acid, and mixtures thereof.

Catalysts employed in the curing system of this invention are organo-mercury and organo-lead compounds, exemplary of which are phenyl mercuric hydroxide, phenyl mercuric acetate, phenyl mercuric stearate, lead octoate, lead linoleate, and lead acetate. The organo-mercury and organo-lead compounds, in combination with the nitrogen containing compound and the above described OH containing compounds, provide an unexpectedly rapid curing system for epoxy resins. That similar results are not obtained with systems employing other conventional organo-metallic compounds in conjunction with the other components of the curing system of this invention is demonstrated below.

The following formulations were prepared employing the organometallic compounds listed in Table II.

TABLE I

| Formula | Grams |
|---|---|
| Epon 820 | 10.1 |
| 3-phenyl-1,1-dimethyl urea | 1.0 |
| Ethylene glycol | 0.5 |
| Catalyst | 0.2 |

TABLE II

| System | Compound |
|---|---|
| 1 | Phenyl mercuric hydroxide. |
| 2 | Phenyl mercuric acetate. |
| 3 | Phenyl mercuric stearate. |
| 4 | Lead octoate. |
| 5 | Lead linoleate. |
| 6 | Lead acetate. |
| 7 | Aluminum octoate. |
| 8 | Tin octoate. |
| 9 | Zinc octoate. |
| 10 | Cobalt naphthenate. |
| 11 | Vanadium naphthenate. |
| 12 | Calcium naphthenate. |
| 13 | Dibutyl tin dilaurate. |
| 14 | Nickel hexoate. |
| 15 | Control A. |
| 16 | Control B. |

Mixtures were prepared according to the formula of Table I employing the organometallic compounds of Table II. Two controls were also prepared—Control A being a mixture of Epon 820, 3-phenyl-1,1-dimethyl urea, and ethylene glycol, and Control B being a mixture of Epon 820 and 3-phenyl-1-1-dimethyl urea alone, in both cases the ingredients being present in the quantities shown in Table I. The mixtures were then placed in an oven at 180° F. After ninety minutes exposure, the mixtures could be segregated into three groups. The first group, consisting of systems 1–6, inclusive, cured to a hard state. The second, consisting of systems 15 and 16, were gelled. The third, consisting of systems 7–14, inclusive, showed a viscosity increase but were short of the gelled state exhibited by systems 15 and 16. This data demonstrates not only that the tested organo-mercury and lead compounds significantly accelerate the epoxy cure but that other representative organo-metallic compounds actually retard the cure.

Since the three essential ingredients of the curing system of this invention function essentially as catalysts, minor amounts of all three may be employed in combination with the material to be cured. Moreover, the relative concentrations of the three ingredients are not at all critical and in fact may vary over broad ranges. Generally, a major amount of the nitrogen-containing component and minor amounts of each of the other two components are employed. However, this could be reversed so that either of the OH containing or organo-metallic compound is in the majority. An excess of any of the three ingredients is not detrimental to the adhesive; it will merely serve as a filler. A suitable composition of the cure system is one containing about .025 to about 500, preferably about 1 to about 25, parts of nitrogen-containing compound per part of OH containing compound, and about .05 to about 5000, preferably about 1 to about 250, parts of nitrogen-containing compound per part of organo-metallic compound. Here, as elsewhere in the specification and claims, parts are by weight unless stated to the contrary. In the presence of an epoxy resin, a ratio of about .25 to about 160, preferably about 2 to about 15, parts by weight of epoxy resin to cure system as defined above is suitable.

In addition to the epoxy resin and curative system, other materials are conventionally employed in the commercially used adhesive. Such materials include fillers, dyes, pigments, viscosity modifiers, flexibilizers and plasticizers. Fillers are used to modify density and electrical conductivity, reduce cost, lower coefficient of thermal expansion, reduce shrinkage, change thermal conductivity, alter surface hardness, reduce exotherms, improve adhesive properties, and change flow characteristics. Fillers can be organic or inorganic, metallic or nonmetallic. Some commonly used materials are asbestos, silica, mica, limestone, aluminum powder, iron powder, aluminum oxide, and phenolic resins.

Dyes and pigments are often added to change the color of the epoxy adhesive for esthetic or identification purposes. Common pigments and dyes include titanium dioxide, carbon black, National Fast Red, and Bismark Brown.

Certain materials can be added to epoxy adhesives in relatively small concentrations to cause a large change in viscosity. Viscosity may be an important factor in handling characteristics of the adhesive. A thickening agent such as Cab-O-Sil, the trade name for a silica available from Cabot Corp., may be employed. Small amounts of elastomers such as polybutadienes, butadiene-acrylonitrile copolymers, or styrene-butadiene copolymers may be used to effect a large viscosity increase. Diluent resins may be employed for viscosity reduction. Typical examples are butyl glycidyl ether and 1,4-butanediol diglycidyl ether.

Flexibilizers and plasticizers are used to impart peel strength, toughness, and impact resistance to the cured adhesive. The materials may or may not contain groups which are reactive with epoxy resins. Typical examples are polyamides, polysulfides, polyesters, polyvinyl butyral, polybutadiene, butadiene acrylonitrile copolymers, epoxidized castor oil, and many other elastomeric and resinous systems.

The following examples are intended to further illustrate the invention. All parts and percentages are by weight unless otherwise indicated

EXAMPLE

The following ingredients were employed in the preparation of an epoxy resin bonding composition.

TABLE III

|  | A (gm.) | B (gm.) | C (gm.) |
|---|---|---|---|
| Epon 820 [1] | 173 | 173 | 173 |
| RD-2 [2] | 17 | 17 | 17 |
| RD-826 [3] | 31 | 31 | 31 |
| Cab-O-Sil M-5 [4] | 11 | 11 | 11 |
| MD-201 aluminum powder | 155 | 155 | 155 |
| Dicyandiamide | 18 | 18 | 18 |
| 3-phenyl-1,1-dimethyl urea | 28.5 | 28.5 | 28.5 |
| Ethylene glycol |  | 6.0 | 6.0 |
| Phenyl mercuric hydroxide |  |  | 2.0 |

[1] A commercial epoxy resin available from Shell Chemical Co. produced by reacting epichlorohydrin and bisphenol A. Epoxy equivalent weight equals 180-195 grams per equivalent.
[2] A diluent epoxy resin composed of 1,4-butanediol diglycidyl ether available from Ciba Products Co.
[3] A copolymer of 1,4-butadiene and acrylonitrile available from the 3M Co.
[4] A thickening agent composed of silica having a small particle size and large surface area, available from Cabot Corp.

Compositions A–C were prepared generally as follows. About 10% of the Epon 820 resin was combined with the dicyandiamide, 3-phenyl-1,1-dimethyl urea, ethylene glycol, and phenyl mercuric hydroxide if any of the latter three are to be included. The mixture is run through a three roll paint mill three times in order to achieve a finely ground dispersion.

The remaining portion of Epon 820 resin is placed in a sigma blade mixer equipped with a steam jacket for heating the contents. The Araldite RD-2 resin and the RD-826 latex rubber are added to the mixer. The blade drive is turned on to mix the three components and heat is applied slowly in order to boil the water from the mixture. The mixture is brought to a temperature of about 230° F. and agitated for ten minutes to insure removal of water. The heat is turned off and the Cab-O-Sil and aluminum powder are added while the mixer contents are still hot. This procedure effects removal of absorbed water in the Cab-O-Sil. Agitation is continued until the mixer contents cool to 125° F. The paint mill batch is added and mixed until dispersed and the completed batch dumped from the mixer.

These formulations were used to make overlap shear bonds which were cured for various lengths of time at 180° F. and tested according to ASTM test method D-1002-64 employing 2024 T-3 aluminum clad sheets.

TABLE IV

|  | Overlap shear strength (p.s.i.) | | |
|---|---|---|---|
|  | A | B | C |
| Cure time, hours |  |  |  |
| 1.5 | 520 | 710 | 605 |
| 2 | 500 | 1,000 | 2,800 |
| 3 | 800 | 1,940 | 3,280 |
| 4 | 3,070 | 4,250 | 4,130 |
| 6 | 4,530 | 4,380 | 4,190 |

The significantly greater overlap shear strength, which is directly related to the amount of cure, for sample C demonstrates the effectiveness of the cure system of this invention. As can be seen from Table IV, the ultimate strength of the bond is not improved by the presence of the cure system of this invention, rather the improvement resides in the rate at which such ultimate strengths are achieved.

Films of the epoxy resin composition of this invention can also be prepared, typically by coating a silicone treated glassine paper with a solution of the resin composition, drying to remove solvent, and then winding into a roll with a light non-woven Dacron scrim disposed on the exposed surface of the film.

What is claimed is:
1. An epoxy resin curing system comprising:
   (1) a room temperature stable nitrogen containing chemical compound decomposable at elevated temperatures to provide an amine having at least one active hydrogen, said nitrogen containing chemical compound being at least one member selected from the class consisting of ureas, guanidines, thioureas, and semicarbazides;
   (2) an organic compound containing at least one OH group, said organic compound being at least one member selected from the class consisting of alcohols, carboxylic acids, hydroxy acids, and mixtures thereof; and
   (3) an organo-metallic compound wherein the metal is selected from the class consisting of lead and mercury.
2. The system of claim 1 wherein said urea is a bis-urea.
3. The system of claim 1 wherein said organic compound containing at least one OH group is an aliphatic polyhydroxy compound.
4. An epoxy resin curing system comprising:
   (1) a room temperature stable nitrogen containing chemical compound decomposable at elevated temperatures to provide an amine having at least one active hydrogen, said nitrogen containing chemical compound being at least one member selected from the class consisting of ureas, guanidines, thioureas, and semicarbazides;
   (2) an organic compound containing at least one OH group, said organic compound being at least one member selected from the class consisting of alcohols, carboxylic acids, hydroxy acids, and mixtures thereof; and
   (3) an organo-metallic compound selected from the class consisting of a mercury or lead salt of an organic acid and phenyl mercuric hydroxide.
5. A composition comprising:
   (1) a room temperature stable nitrogen containing chemical compound decomposable at elevated temperatures to provide an amine having at least one active hydrogen, said nitrogen containing chemical compound being at least one member selected from the class consisting of ureas, guanidines, thioureas, and semicarbazides;
   (2) an organic compound containing at least one OH group, said organic compound being at least one member selected from the class consisting of alcohols, carboxylic acids, hydroxy acids, and mixtures thereof;
   (3) an organo-metallic compound wherein the metal is selected from the class consisting of lead and mercury; and
   (4) an epoxy resin having at least one 1, 2 epoxy group per molecule.
6. A composition comprising:
   (1) a room temperature stable nitrogen containing chemical compound decomposable at elevated temperatures to provide an amine having at least one active hydrogen, said nitrogen containing chemical compound being at least one member selected from the class consisting of ureas, guanidines, thioureas, and semicarbazides;

(2) an organic compound containing at least one OH group, said organic compound being at least one member selected from the class consisting of alcohols, carboxylic acids, hydroxy acids, and mixtures thereof;

(3) an organo-metallic compound selected from the class consisting of a mercury or lead salt of an organic acid and phenyl mercuric hydroxide; and (4) an epoxy resin having at least one 1,2 epoxy group per molecule.

References Cited
UNITED STATES PATENTS

| | | | |
|---|---|---|---|
| 2,803,609 | 8/1957 | Schlenker | 260—47Ep |
| 3,294,749 | 12/1966 | Pratt | 260—47Ep |
| 3,427,259 | 2/1969 | Garty et al. | 260—47Ep |

WILLIAM H. SHORT, Primary Examiner

T. E. PERTILLA, Assistant Examiner

U.S. Cl. X.R.

117—161; 252—182; 260—2, 37, 59, 79, 830